United States Patent [19]

Frye et al.

[11] Patent Number: 5,589,113
[45] Date of Patent: Dec. 31, 1996

[54] PROCESS OF INVERTING AN ARTICLE OR AIR BAG

[75] Inventors: Ricky J. Frye, Miamisburg; Jon T. Mitts; Ron Rufener, both of Milford, all of Ohio

[73] Assignee: MIM Industries, Inc., Miamisburg, Ohio

[21] Appl. No.: 239,327

[22] Filed: May 6, 1994

[51] Int. Cl.$^6$ .................................................. B29C 69/00
[52] U.S. Cl. ......................... 264/40.5; 264/295; 264/339; 264/340
[58] Field of Search .................................. 264/40.5, 295, 264/339, 340

[56] References Cited

U.S. PATENT DOCUMENTS 4,187,344 12/1979 Smith et al. ............................ 264/572

*Primary Examiner*—Leo B. Tentoni
*Attorney, Agent, or Firm*—Jacox, Meckstroth & Jenkins

[57] ABSTRACT

A method and apparatus for inverting and flattening an air bag including an inverter for inverting the air bag and an actuator for actuating the air bag to cause it to flatten. The inverter includes a plunger moveable in a vertical direction through an aperture in a conveyor table to cause a face panel of the air bag to pass through an aperture formed in a main panel of the air bag. The actuator includes a spin disk for causing an inertial force to be applied to the air bag whereby outer portions of the air bag are caused to move radially outwardly relative to a central gripped portion. After the air bag is flattened, it is dropped down onto belts running along the conveyor table and the belts are actuated to convey the bag out of the apparatus. In addition, a load table is provided for automatically moving air bags into alignment with the inverter in preparation for an inversion and flattening cycle.

16 Claims, 7 Drawing Sheets

PROCESS OF INVERTING AN ARTICLE OR AIR BAG

BACKGROUND OF THE INVENTION

1. Field of the Invention

This invention relates to a method and apparatus for reversing or inverting a supplemental restraint cushion on air bag and, more particularly, this invention relates to inverting an air bag and subsequently actuating the air bag to flatten panels forming the air bag against each other.

2. Related Prior Art

Air bags are increasingly used as an additional or supplemental restraint system in automobiles, and there is a corresponding increasing need for manufacturing methods and apparatus which facilitate the construction of the air bags and thereby also reduce the time and cost of constructing the air bags. Conventional air bags are typically formed of a main panel and a face panel which are sewn together along their peripheral edges whereby a cavity is defined between the two panels. After the panels are joined together, the air bag must be reversed or inverted through an aperture in the main panel in order to locate the seam extending around the periphery of the air bag within an interior portion of the bag. In addition, the air bag must also be flattened after it is inverted in order to prepare the air bag for a folding operation wherein the air bag is folded into a compact configuration for storage in the steering wheel or dashboard of a vehicle.

In one known method of reversing an airbag, the air bag is placed on a first plate having an aperture therethrough with the aperture in the main panel facing the aperture of the plate. A plunger is actuated to extend into contact with the face panel to thereby force it through the apertures in the main panel and the plate. Pressurized air is then supplied to the interior of the reversed air bag to cause it to expand outwardly, and another plate is then moved toward the first plate to flatten the air bag therebetween. This method of reversing and flattening an air bag is relatively labor intensive in that the aperture of the air bag must be manually aligned onto the aperture of the first plate, and it is also necessary to first expand the air bag with air prior to performing the flattening operation.

Accordingly, there is a need for a method and apparatus for easily and quickly inverting and flattening successive air bags.

SUMMARY OF THE INVENTION

The present invention provides a method and apparatus for reversing or inverting and flattening a supplemental inflatable restraint cushion, or air bag, which is formed of a pair of overlapping sheets sewn along the outer peripheral edges thereof. In one aspect of the invention, an apparatus is provided for operating on an article defining a cavity, such as an air bag, comprising an inverter for inverting the cavity and an actuator for causing the article to be flattened.

In a further aspect of the invention, the inverter comprises a plunger for pushing a portion of the article through an aperture defined in the article, and the actuator is adapted to move the article to create an inertial force on portions of the article. More specifically, the apparatus includes a conveyor table defining an aperture therethrough and the plunger is adapted to move in a first direction through the aperture and the conveyor table. As the plunger moves in the first direction toward the conveyor table, it causes the article to engage a surface on the conveyor table in order to limit movement of the portion of the article surrounding the aperture in the article. A portion of the article engaged with the plunger continues to move with plunger through the aperture in the conveyor table whereby the article is reversed or inverted. The plunger continues to move, drawing the article with it, until it contacts the actuator which comprises a spin disk. The spin disk is actuated for rotational movement by a motor whereby the article will be rotated or spun to cause a centrifugal force to be applied to outer portions of the article to thereby flatten the article.

Once the article has been flattened, the plunger retracts back to a rest position and the article is deposited on an upper surface of the conveyor table. The conveyor table includes a pair of conveyor belts which are automatically actuated to convey the flattened article out of the apparatus.

In addition, a load table is provided for conveying an article to be inverted into the apparatus. The load table is slidably mounted on rails and is actuated for movement by a driver such as a rodless cylinder. An operator may load an article onto the load table and the load table will be automatically actuated to move the article into alignment with the inverter in preparation for the inverting and flattening operations. The operations of the apparatus are controlled by a controller which automatically actuates the inverter and actuator, as well as the load and conveyor tables.

In a further aspect of the invention, a method of operating on an article defining a cavity is provided comprising the steps of inverting the article and actuating the article to cause the article to flatten. The step of inverting the article further includes causing the article to engage a surface and pushing a portion of the article through an aperture in the surface. The step of actuating the article further includes moving the article to create an inertial force on portions of the article wherein the step of moving the article may comprise rotating the article.

In yet another aspect of the invention, the step of actuating the article comprises causing a plunger to move the article into engagement with the actuator whereby the article is gripped between the inverter and the actuator. The actuator causes the article to move such that an outer portion of the article moves relative to an inner gripped portion of the article to cause the article to flatten. In addition, the plunger causes the actuator to move upwardly away from a conveyor table through which the article is caused to pass whereby the article is progressively drawn through the conveyor plate as it is caused to rotate.

Other objects and advantages of the invention will be apparent from the following description, the accompanying drawings and the appended claims.

DETAILED DESCRIPTION OF THE PREFERRED EMBODIMENT

Figure 1:
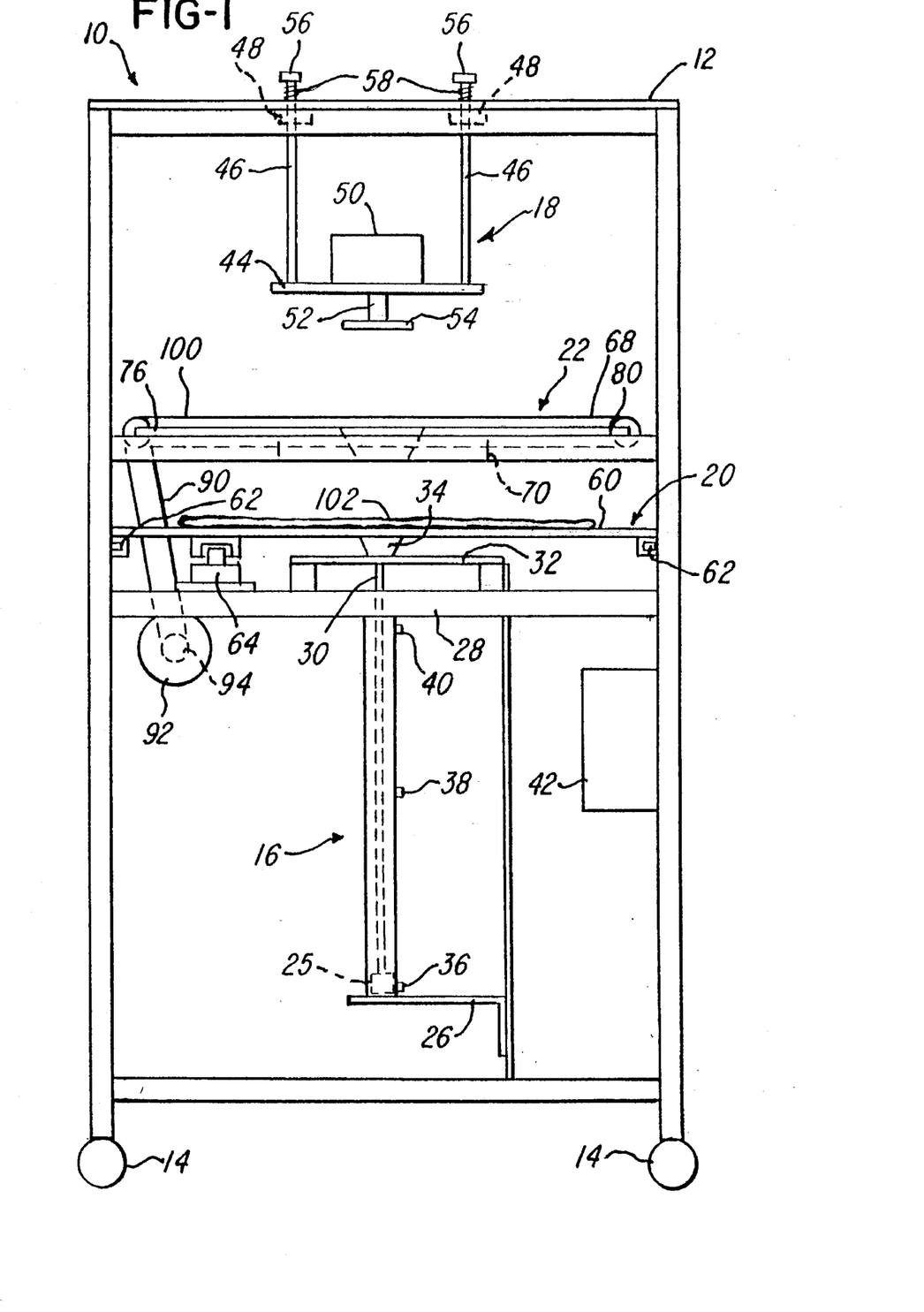
FIG. 1 is a front elevational view of the apparatus of the present invention showing an air bag in position to be inverted.

Referring initially to FIG. 1, the inverter apparatus 10 of the present invention includes a frame 12 which may be supported on casters 14 to enable the apparatus 10 to be moved to different locations. The frame 12 forms a support structure for mounting an inverter 16 and an actuator 18, as well as for supporting a load table assembly 20 and a conveyor table assembly 22.

Figure 4:
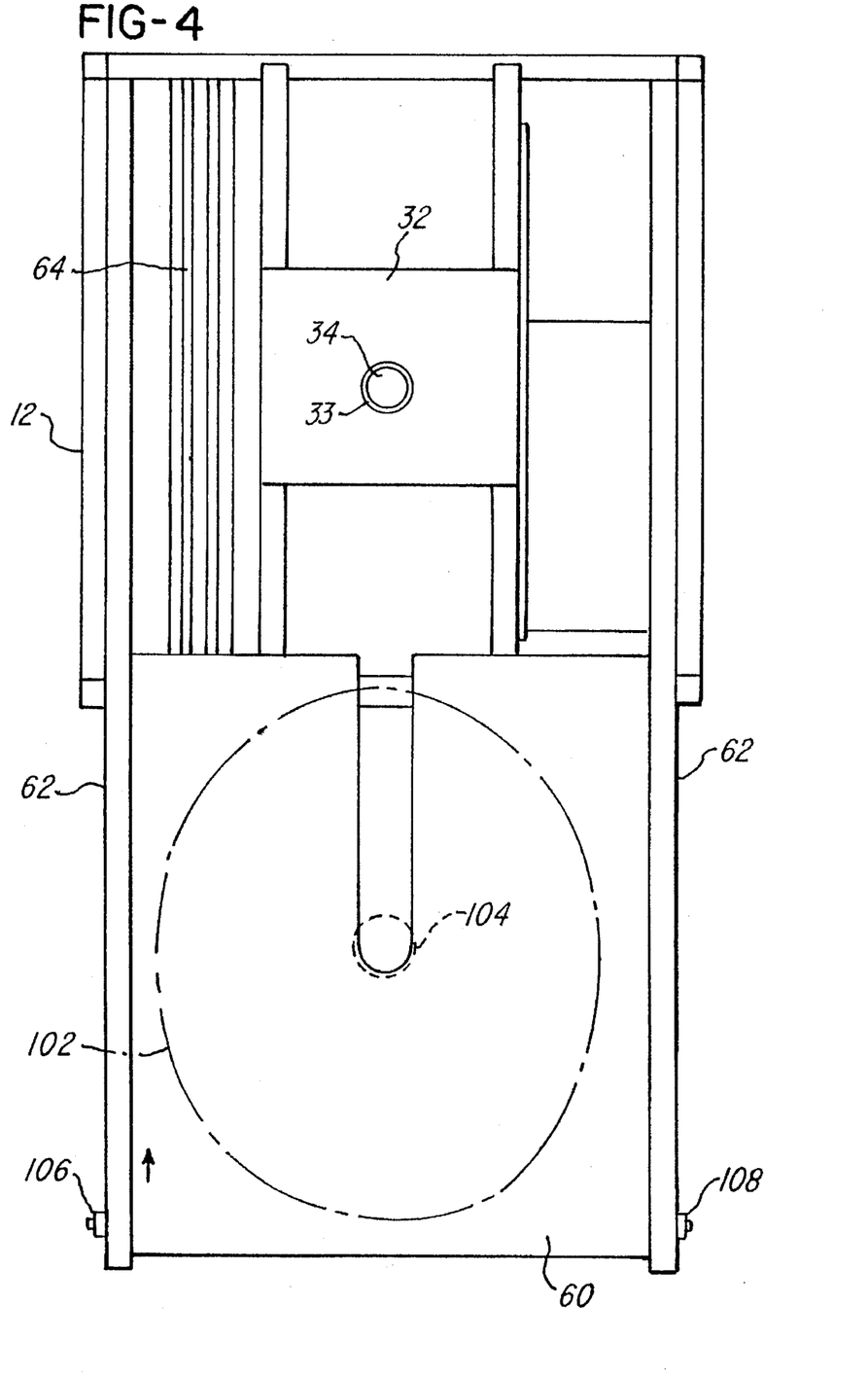
FIG. 4 is a top plan view of the apparatus taken between the conveyor table and load table and illustrating movement of the load table to load an air bag into the apparatus.

The inverter 16 includes a driver in the form of a cylinder 24. The cylinder 24 is preferably a pneumatic cylinder, although a hydraulic or other equivalent cylinder may be used. The cylinder 24 is supported within the frame 12 by means of a bracket structure 26 at a lower end thereof and a support plate structure 28 at an upper end thereof. The cylinder 24 includes a piston 25 for driving vertically moveable actuation rod 30 which is guided through an aperture 33 in a guide plate 32 (FIG. 4). An inverter plunger 34 is mounted to the upper end of the rod 30 and is tapered outwardly in a first or upward direction for reasons which will be discussed below. In addition, the cylinder 24 includes a first position sensor 36, a second position sensor 38 and a third position sensor 40 located at vertically spaced positions along the cylinder 24. The position sensors 36, 38 and 40 are connected to a controller 42 for controlling inverting and flattening processes of the apparatus 10, as will be described in detail below.

Figure 7:
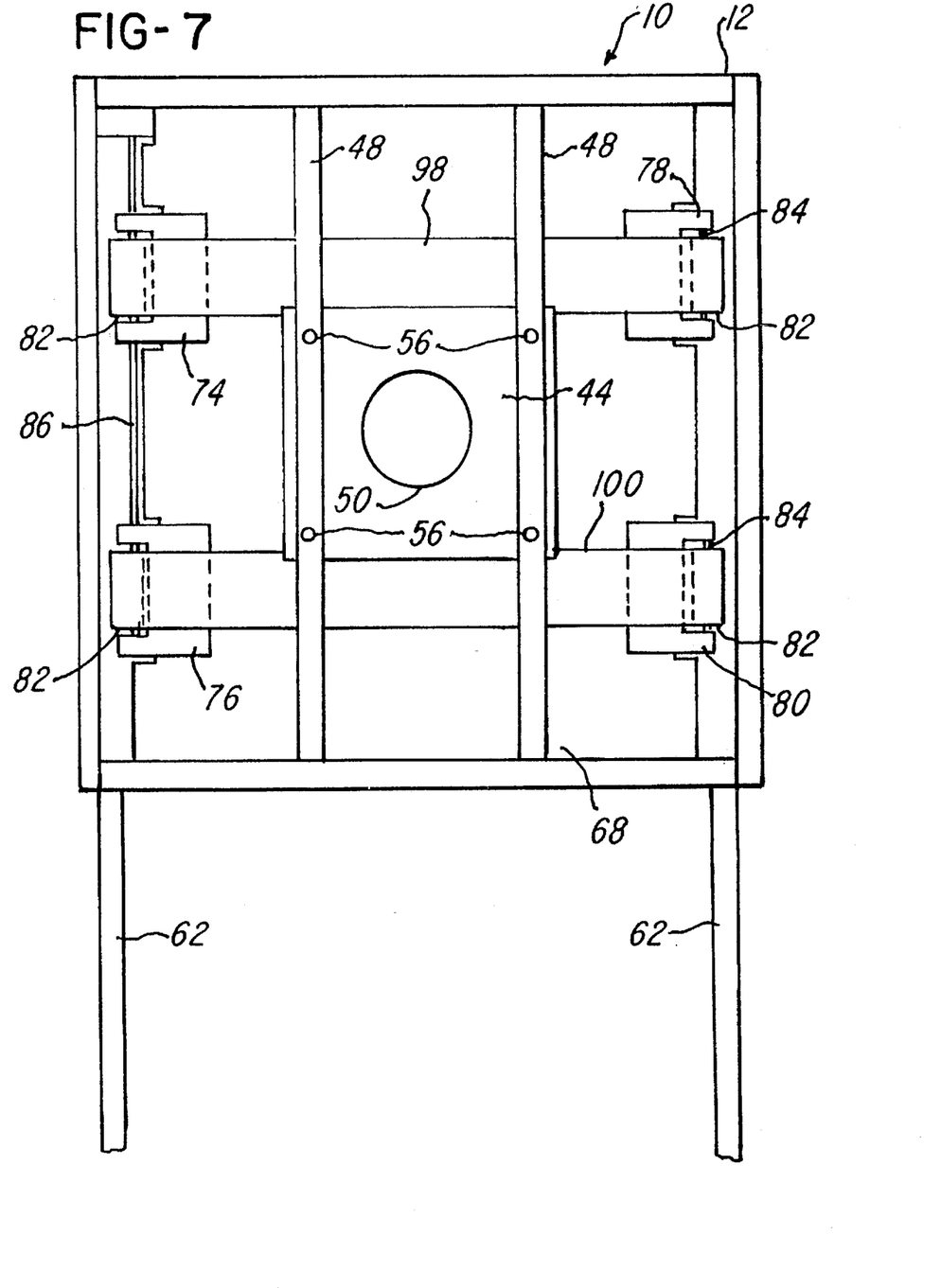
FIG. 7 is a top plan view of the apparatus.

The actuator 18 comprises an actuator support plate 44 supported by four guide rods 46 which are mounted for sliding movement through support braces 48 extending across the frame 12 (FIG. 7). A motor 50, such as an air motor or other equivalent motor, is mounted to the actuator support plate 44 and includes a shaft portion 52 extending through the plate 44 for rotatably driving a spin disk 54. In a rest position, the weight of the actuator 18 causes it to depend downwardly with capped ends 56 of the rods 46 engaging cushioning springs 58 to support the actuator 18.

Referring to FIGS. 1 and 4, the load table assembly 20 comprises a load table 60 supported for sliding movement toward a front portion of the apparatus 10 by means of bearing rails 62 whereby the load table 60 may glide toward and away from the inverter 16. The load table 60 is actuated for movement along the rails 62 by means of a driver which is preferably a pneumatic rodless cylinder 64, although other equivalent drivers may be used. Further, as seen in FIG. 4, the load table 60 includes an elongated slot 66 extending from a rear edge of the table 60 to permit clearance between the load table 60 and the rod 30 of the inverter 16 such that the table 60 is adapted to move along the rails 62 when the rod 30 is in an extended position.

Figure 5:
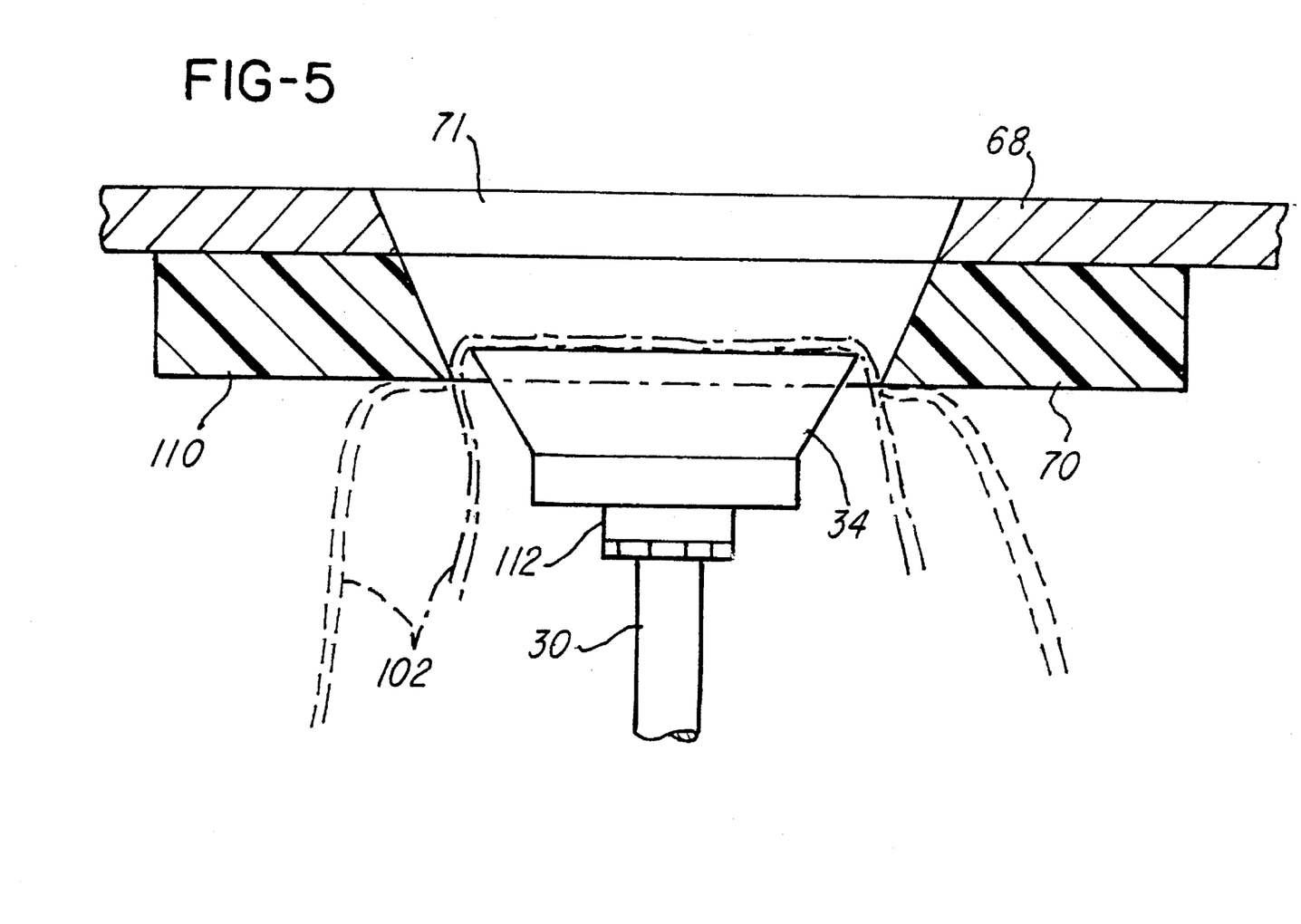
FIG. 5 is a cross-sectional view taken through the conveyor table illustrating passage of the plunger for the inverter through the aperture in the conveyor table.
Figure 6:
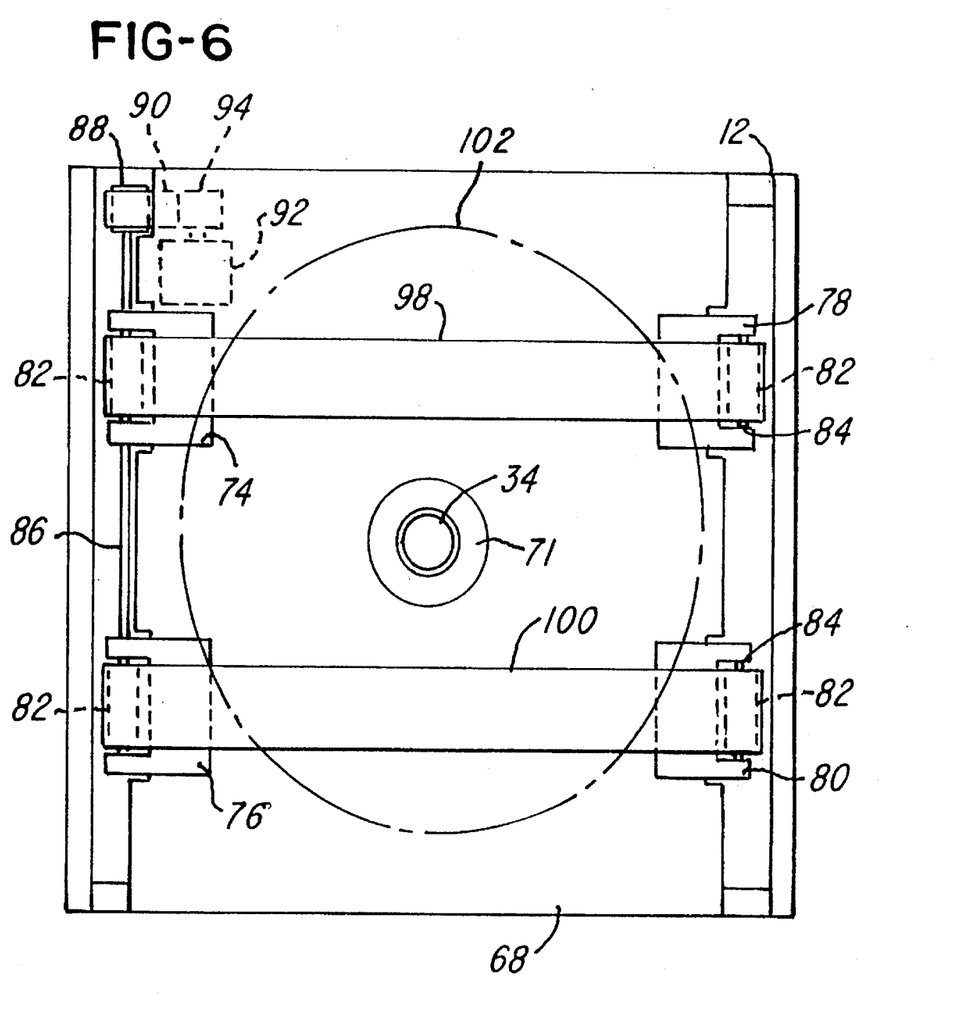
FIG. 6 is a top plan view taken between the actuator and the conveyor table illustrating operation of the conveyor table to unload an inverted air bag from the apparatus.

Referring to FIGS. 1 and 6, the conveyor table assembly 22 includes a conveyor table 68 having an inversion ring 70 (FIG. 5) attached to a lower portion thereof. The conveyor table 68 and inversion ring 70 define an aperture 71 therethrough. The inversion ring 70 is adapted to engage and form a resistance surface to a main panel of an air bag while permitting a face panel thereof to pass through the aperture 71 during an inverting operation, and the inversion ring 70 is preferably formed of a low friction material such as Delron, although other materials with similar characteristics may also be selected.

As best seen in FIG. 6, the conveyor table assembly 22 includes four conveyor supports 74, 76, 78 and 80 mounted to the conveyor table 68. Each conveyor support 74, 76, 78, 80 rotatably mounts a belt roller 82 wherein the belt rollers 82 mounted to the conveyor supports 78 and 80 are mounted on short shafts 84 and are freely rotatable. The other two belt rollers 82 mounted to the conveyor supports 74 and 76 are mounted for rotation with a shaft 86, and the shaft 86 includes a driven pulley 88 at one end thereof. A drive motor 92, such as a pneumatic or equivalent motor, is mounted to the frame 12 and includes a drive pulley 94 for driving a belt 90 operably engaged with the driver pulley 88 whereby the rollers 82 on the conveyor supports 74 and 76 are driven. A pair of conveyor belts 98 and 100 extend between the respective pairs of conveyor supports 74, 78 and 76, 80 whereby an air bag deposited on the conveyor table 68 may be conveyed out of the apparatus 10.

In a process using the present apparatus 10 to operate on an article, such as an air bag 102, the air bag 102 is first deposited on the load table 60 by an operator standing in front of the apparatus 10 adjacent to the rails 62 (FIG. 4). The air bag 102 is preferably formed with a face panel and a main panel joined along the peripheral edges thereof to define a cavity within the air bag 102. In addition, the main panel includes a fill opening 104 which is designed to be used to fill the air bag with a pressurized gas during its use in a vehicle. The air bag 102 is placed on the load table 60 with the main panel and aperture 104 facing upwardly and with the aperture 104 located adjacent an end of the slot 66 near the center of the table 60. With the air bag 102 in place on the load table 60, the operator presses switches 106 and 108 located on the rails 62 to indicate to the controller 42 that an air bag has been positioned to undergo an operation in the apparatus 10. The controller 42 then actuates the rodless cylinder 64 to move the load table 60 toward the inverter 16 until the fill opening 104 in the air bag 102 is aligned over the aperture 33 and plunger 34. It should be noted that prior to moving the load table 60 toward the inverter 16, the controller 42 checks to verify that the sensor 36 has been activated by the piston 25 indicating that the plunger 34 is in its lowermost position.

With the air bag 102 located over the inverter 16, as shown in FIG. 1, the cylinder 24 is actuated to cause the plunger 34 to move upwardly in the first direction through the slot 66 in the load table 60 and into engagement with the face panel of the air bag 102. As the plunger 34 continues upwardly, it causes the main panel to engage a lower surface 110 of the inversion ring 70. It should be noted that the lower edge of the aperture 71 adjacent to the surface 110 is formed with a diameter substantially equal to the diameter of the fill opening 104 in the air bag 102 and acts to prevent the main panel of the air bag 102 from passing through the aperture 71 during upward passage of the plunger 34. As the plunger 34 moves upwardly through the aperture 71, it causes the front panel of the air bag 102 to move through the air bag aperture 104 to thereby reverse or invert the air bag 102. Further, it should be noted that the tapered shape of the aperture 71 cooperates with the tapered shape of the plunger 34 such that there is a close fit between the leading edge of the plunger 34 and the edge of the aperture 71 near the surface 110 during the initial passage of the front panel through the air bag aperture 104 to facilitate initiation of the inversion operation. Subsequently, as the plunger 3 passes upwardly through the aperture 71, a greater spacing is formed between the plunger 4 and the wall of is the aperture 71 to accommodate an increasing amount of material being pulled through the aperture 71.

Figure 2:
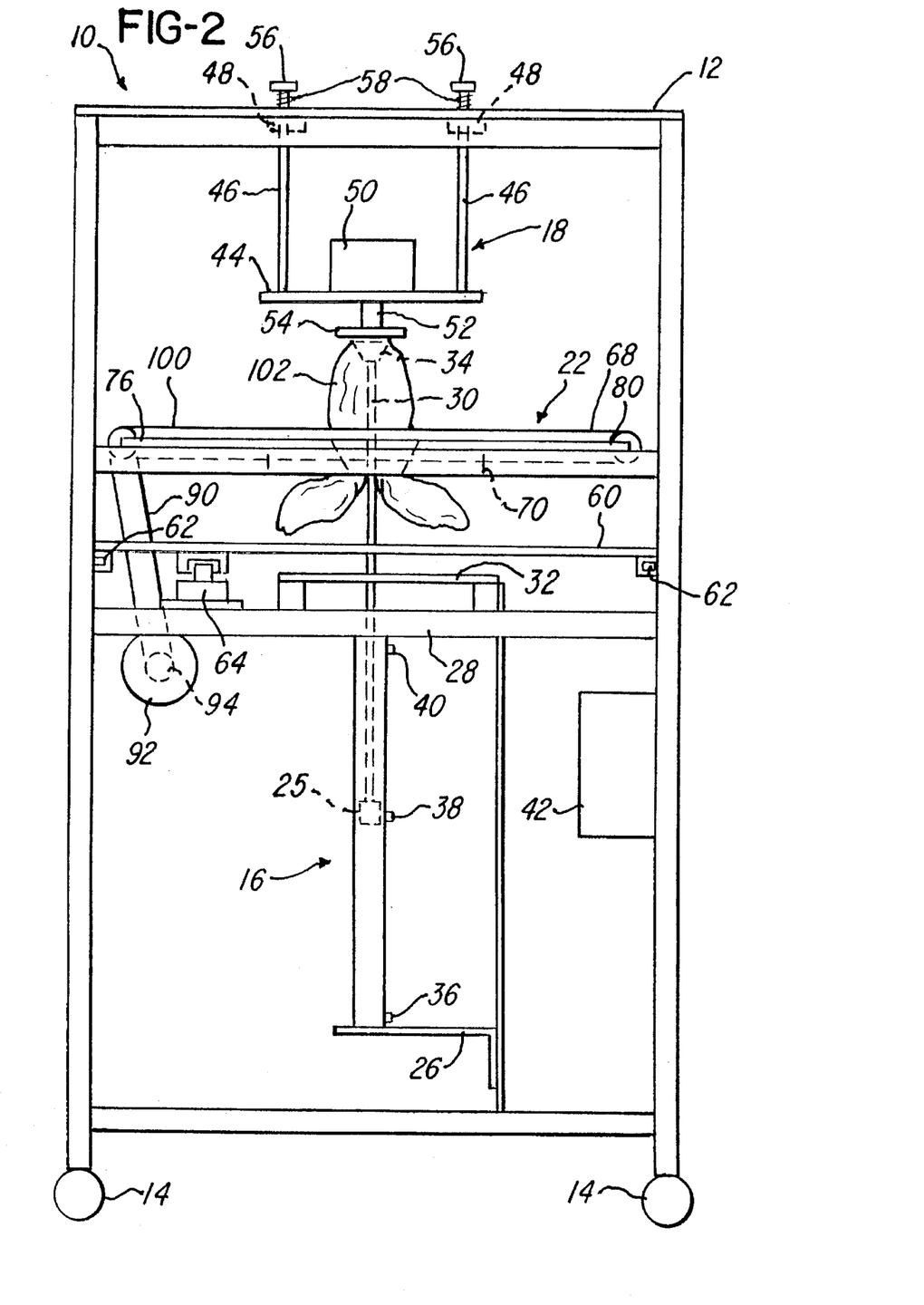
FIG. 2 is a front elevational view showing a partially inverted air bag as the inverter initially contacts the actuator.

As the plunger 34 continues upwardly, it moves the air bag 102 into engagement with the spin disk 54 of the actuator 18, as seen in FIG. 2. At approximately the same time as, or slightly after, the air bag 10 engages the spin disk 54, the piston 25 of the cylinder 24 moves into alignment with and actuates the switch 38 causing the controller 42 to energize the motor 50 of the actuator 18. At this point a central portion of the air bag 102 is gripped between the plunger 34 and the spin disk 54 such that the air bag 102 begins to rotate as it is pulled through the aperture 71 in the conveyor table assembly 22. It should be noted that the plunger 34 is mounted to the rod 30 of the cylinder 24 by bearing means 112 (see FIG. 5) such that the plunger 34 is freely rotatable with the spin disk 54 and air bag 102.

Figure 3:
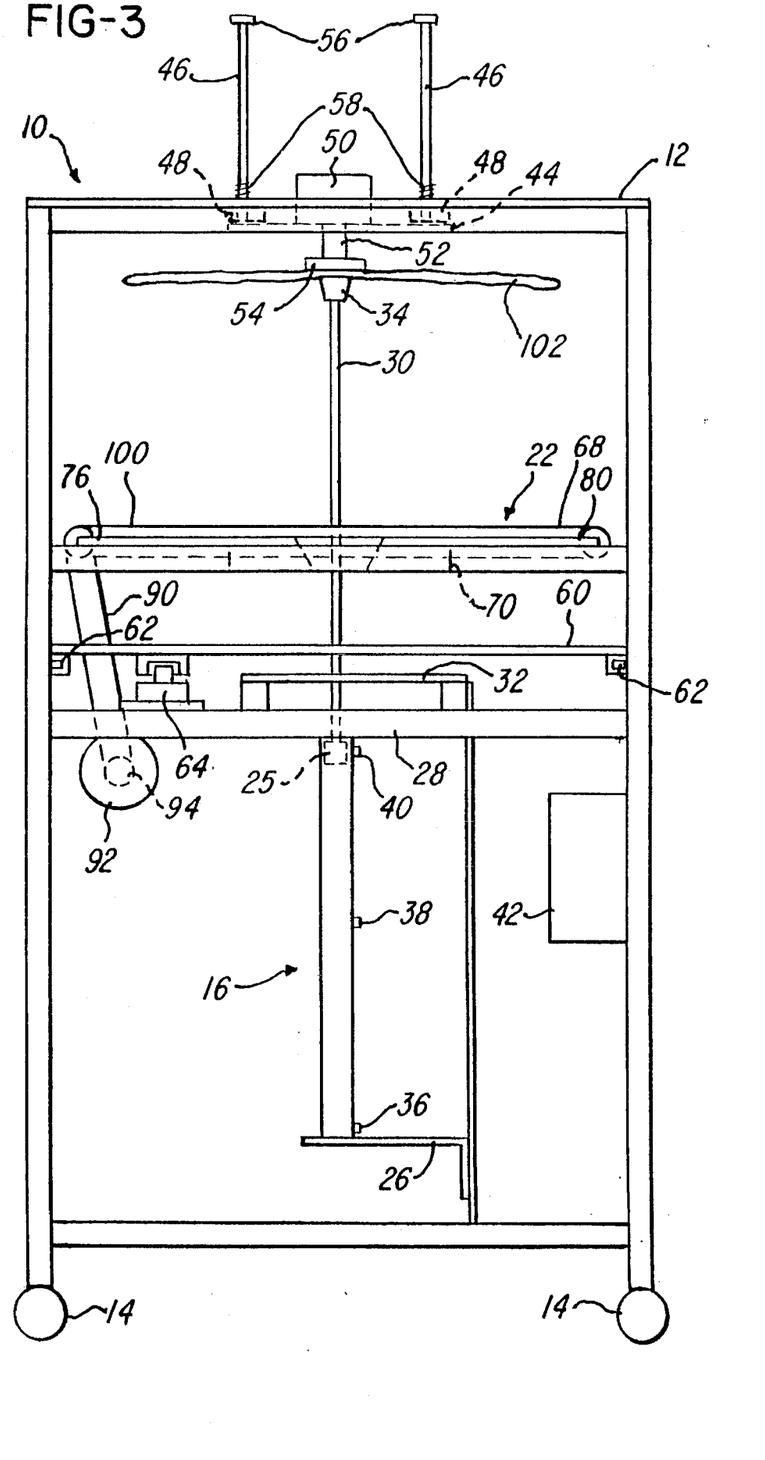
FIG. 3 is a front elevational view illustrating an inverted air bag which has been flattened by the actuator.

The cylinder 24 continues to cause the plunger 34 to move upwardly thereby pushing the actuator assembly 18 upwardly, guided by the rods 46, until the air bag 102 clears the aperture 71 in the conveyor table assembly 22. The rotating or spinning movement of the spin disk 54 causes an actuation force in the form of an inertial or centrifugal force to be applied to the air bag 102. Specifically, the portions of the air bag 102 located radially outwardly from the gripped central portion thereof have a centrifugal force applied thereto whereby the outer portions of the air bag 102 are caused to move relative the central gripped portion and to spread radially outwardly into a flattened configuration, as seen in FIG. 3.

When the plunger 34 reaches the upper end of its travel, as sensed by a signal sent from the switch 40 to the controller 42, the cylinder 24 will be actuated to cause the plunger 34 to rapidly withdraw thereby causing the actuator 18 to drop into engagement with the springs 58, and permitting the air bag 102 to drop onto the conveyor belts 98 and 100. The controller 42 energizes the motor 92 to drive the belts 98 and 100 whereby the inverted and flattened air bag is ejected from the apparatus 10. In the preferred embodiment, the controller 42 causes the motor 92 to be energized for a predetermined period of time sufficient to convey the air bag 102 away from the conveyor table assembly 22.

It should be noted that once the air bag 102 is conveyed through the aperture 71 in the conveyor table assembly 22 into engagement with the actuator 18, such as is shown in FIG. 2, the load table 60 may be actuated by the controller 42 to move forwardly along the rails 62 to be loaded with another air bag. Once the air bag 102 has been positioned on the load table 60, the worker will press the buttons 106 and 108 and the system will be armed in preparation to move the load table 60 with its air bag 102 into position over the inverter 16 once the controller senses that the cylinder 24 has moved the plunger 34 to its retracted or lowered position and the conveyor table assembly 22 has completed its operation of discharging an inverted and flattened air bag from the apparatus 10. Thus, the present apparatus provides for automatic loading and discharge of air bags into and out of the apparatus.

From the above description, it should be apparent that the present invention is adapted to substantially speed up the process of inverting and flattening air bags in that as one bag is being inverted and flattened, another bag is being loaded for the next cycle. Further, by applying an actuation force in the form of a centrifugal force to flatten the air bag, the time for processing the air bag is substantially decreased.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. A method of operating on an article defining a cavity comprising the steps of:
   (a) inverting the article; and
   (b) moving the entire article to cause the article to flatten.

2. The method as recited in claim 1 wherein said step (a) comprises pushing a portion of said article defining said cavity through an aperture in said article.

3. The method as recited in claim 1 wherein said step (a) further comprises causing said article to engage a surface and pushing said portion of said article through an aperture in said surface.

4. A method of operating on an article defining a cavity comprising the steps of:
   (a) inverting the article; and
   (b) actuating the article to cause the article to flatten, wherein said step (b) comprises moving said article to create an inertial force on portions of said article.

5. The method as recited in claim 4, wherein said step of moving said article comprises rotating said article.

6. A method of operating on an article defining a cavity comprising the steps of:
   (a) inverting the article; and
   (b) actuating the article to cause the article to flatten, wherein said article comprises an air bag and said step (b) includes gripping a central portion of said air bag and causing a force to be applied to said air bag in a direction away from said central portion.

7. A method of inverting an air bag defining a cavity and a fill aperture opening into said cavity, said method comprising the steps of:
   (a) causing an interior surface of said air bag to pass through said fill aperture;
   (b) gripping a portion of said air bag; and
   (c) moving the gripped portion of said air bag to cause a further portion of said air bag to move relative to the gripped portion to thereby flatten said air bag.

8. The method as recited in claim 7 wherein said step (b) comprises gripping a central portion of said air bag.

9. The method as recited in claim 8 wherein said further portion of said air bag comprises a portion of said air bag extending outwardly from said central portion.

10. The method as recited in claim 7 wherein said step (c) comprises creating an inertial force on said further portion of said air bag.

11. The method as recited in claim 10 wherein said inertial force comprises a centrifugal force.

12. The method as recited in claim 7 wherein said step (a) further comprises:
   (a)(1) moving a plunger into engagement against a side of said air bag opposite from said aperture; and
   (a)(2) causing said plunger and said air bag to pass through an aperture in a conveyor table.

13. The method as recited in claim 12 wherein said step (b) further comprises said plunger moving said air bag into engagement with an actuator for causing said further portion of said air bag to move relative to the gripped portion.

14. The method as recited in claim 13 wherein said plunger causes said actuator to move in a direction away from said conveyor table.

15. The method as recited in claim 14 wherein said actuator rotates said air bag as said air bag passes through said aperture in said conveyor table.

16. The method as recited in claim 13 including the step of sensing the position of said plunger and energizing said actuator when said plunger reaches a predetermined location.

* * * * *